United States Patent [19]

Dufresne et al.

[11] Patent Number: 6,100,216

[45] Date of Patent: Aug. 8, 2000

[54] PROCESS FOR INCORPORATING SULFUR INTO THE PORES OF A HYDROCARBON TREATMENT CATALYST

[75] Inventors: Pierre Dufresne, Valence; Nilanjan Brahma, La Voulte sur Rhone; Jean Darcissac, Saint Georges les Bains; Franck Labruyere, Lyons, all of France

[73] Assignee: Europeenne de Retraitement de Catalyseurs Eurecat, France

[21] Appl. No.: 08/784,954

[22] Filed: Jan. 16, 1997

[30]  Foreign Application Priority Data

Jan. 17, 1996 [FR] France ................................. 96 00644

[51] Int. Cl.$^7$ .......................... B01J 27/047; B01J 27/051
[52] U.S. Cl. .......................... 502/219; 502/216; 502/220; 502/221; 502/222; 502/223
[58] Field of Search .................................. 502/216, 219, 502/220, 221, 222, 223

[56]  References Cited

U.S. PATENT DOCUMENTS

| | | | |
|---|---|---|---|
| 3,933,683 | 1/1976 | Hilfman | 252/439 |
| 4,172,027 | 10/1979 | Ham et al. | 208/140 |
| 4,334,982 | 6/1982 | Jacquin et al. | 208/216 R |
| 4,530,917 | 7/1985 | Berrebi | 502/220 |
| 4,719,195 | 1/1988 | Toulhoat et al. | 502/216 |
| 5,139,983 | 8/1992 | Berrebi et al. | 502/33 |
| 5,153,163 | 10/1992 | Roumieu et al. | 502/222 |
| 5,654,252 | 8/1997 | Dufresne et al. | 502/220 |

FOREIGN PATENT DOCUMENTS

| | | |
|---|---|---|
| 0 466 567 | 1/1992 | European Pat. Off. . |
| 0 530 068 | 3/1993 | European Pat. Off. . |
| 0 628 347 | 12/1994 | European Pat. Off. . |
| 1 268 131 | 12/1961 | France . |
| 2 149 429 | 3/1973 | France . |

*Primary Examiner*—John F. Niebling
*Assistant Examiner*—Alexander G. Ghyka
*Attorney, Agent, or Firm*—Millen, White, Zelano & Branigan, P.C.

[57]  ABSTRACT

A process for presulfurizing a hydrocarbon treatment catalyst and/or for preconditioning a catalyst, comprising one or two stages of incorporating sulfur into the pores of a hydrocarbon conversion catalyst conducted off-site in at least one zone that contains a catalyst, preferably in motion, and with either suilirated hydrogen ($H_2S$), sulfur, or a sulfur compound capable of evolving nascent suilirated hydrogen.

11 Claims, No Drawings

PROCESS FOR INCORPORATING SULFUR INTO THE PORES OF A HYDROCARBON TREATMENT CATALYST

It is often desirable to perform sulfuration (generally called "presul-furation") of metals that fall within the composition of certain refining catalysts and/or hydrocarbon hydroconversion catalysts, either when these catalysts are new or at the end of the regeneration of these catalysts before they are reused.

Presulfurizing new or regenerated catalysts is thus desirable in order to use these catalysts in refining reactions, for example, the reactions of hydrotreating or hydrodesulfurizing or hydrocracking of various petroleum fractions whose sulfur content has to be reduced or whose other characteristics are to be improved before use.

Such reactions (in particular hydrotreating) are generally carried out in the presence of hydrogen, between 200 and 400° C. at a pressure of between, for example, 5 and 200 bar, with a volumetric flow rate (expressed in m$^3$ of liquid injected batch per m$^3$ of catalyst and per hour) of between 0.1 and 10.

The catalyst that is used for this type of hydrotreating contains a substrate, for example an alumina or alumina mixtures (Patent U.S. Pat. No. 4,334,982) or any other suitable substrate based on at least one oxide of a metal or metalloid, such as magnesia, silica, silica-alumina, silica-magnesia, boron aluminas, clay, carbon, fluorinated alumina, whereby said substrate mixture or substrate mixtures can come at least in part in amorphous form or in crystallized form (zeolite), and the catalyst also contains 0.2 to 30% of at least one active metal of groups VI, VIII or the like selected from, for example, the group that consists of cobalt, molybdenum, nickel and tungsten (U.S. Pat. No. 3,732,155 and 3,804,748). A pair of two of these metals, for example, one of the cobalt-molybdenum, nickel-molybdenum, nickel-tungsten pairs, is generally used. As an example, it is always possible to use a noble metal from group VIII of the platinum family: Pt, Pd, (U.S. Pat. No. 4,098,682).

Thus, in the prior art, the catalyst, new or regenerated, before being used, is generally subjected to sulfuration (presulfuration) that is carried out in a hydrodesulfuration reactor. This sulfuration makes it possible to include in the catalyst, for example, about 50 to 110% of the stoichiometric amounts of sulfur that are calculated based on the amounts of formula sulfur (according to the metals present), $Co_9S_8$, $MoS_2$, $WS_2$ and $Ni_3S_2$.

This sulfuration (presulfuration) is carried out, in the prior art, at a temperature that is close to or higher (i.e., greater than 180° C. and more particularly above 250° C.) than the reaction temperature that is selected for the hydrodesuiliration reaction, for some hours, with a mixture of sulfurated hydrogen ($H_2S$) that is generally diluted in hydrogen (ratio of sulfurated hydrogen to hydrogen on the order of 0.5 to 5% by volume) (U.S. Pat. No. 4,334,982). The sulfuration (or presulfuration) itself can be carried out in temperature plateaus (European Patent EP-B-64429). It is possible to use various sulirizing agents, other than sulfurated hydrogen ($H_2S$) and, for example, a sulfurated compound of the family of mercaptans, carbon sulfide ($CS_2$), sulfides or disulfides, thiophenic compounds and, preferably, dimethyl sulfide (DMS) and dimethyl disulfide (DMDS) or polysulfides.

For example, for hydrocarbon hydroreforming reactions, the catalyst can contain, for example, at least one metal from the platinum family, i.e., a noble metal such as platinum, palladium, iridium, rhodium, ruthenium, or osmium that is deposited on a suitable substrate (alumina, silica, silica-alumina, fluorinated aluminas, fluorinated silicas, zeolite, etc . . . or mixtures of such substrates). The total content of noble metals is between, for example, 0.1 and 5% by weight relative to the catalyst. The catalyst also can contain generally at least one halogen (chlorine, fluorine, etc . . . ) with a content by weight of 0 to 15%. If appropriate, the catalyst also contains at least one promoter metal that is selected from widely varying groups of the periodic table.

For these reactions for catalytic reforming or for aromatic hydrocarbon production, the sulfuration of the new or regenerated catalyst is accompanied by hydrogen reduction of catalyst and is carried out at or near the head of the reactor. The temperature in the sulfuration zone is dictated by the temperature at which the reduction is carried out or generally between 480 and 600° C. in the majority of cases. The difficulty of this type of on-site sulfuration, i.e., near the reactors, has involved sulfuration operations that are often tedious, though effective (U.S. Pat. No. 4,172,027).

The sulfurizing agent that is used in the prior art is sulfurated hydrogen that is either pure or diluted with hydrogen (under the operating conditions that are indicated above) or with gaseous hydrocarbons, or even dimethyl disulfide that is diluted with hydrogen, or other sulfurated compounds, such as alkyl sulfides or alkyl mercaptans, diluted with hydrogen.

Sulfuration (presulfuration) of a new or regenerated catalyst is also suitable, in some cases, for partial or total catalyst sulfuration, also based on one of the substrates already cited and at least one of the active metals already cited, which can be used in reactions, hydrocarbon conversions such as the reactions of hydrogenation, dehydrogenation, alkylation, hydroalkylation, dealkylation, hydrodealkylation, dealkylation with water vapor, isomerization and hydrodemetallization (or demetallization) of heavy batches.

When it is necessary, the sulfuration or presulfuration can be carried out advantageously according to one of the techniques of the prior art that are mentioned above.

Another refining reaction that can be specially adapted to these presulfuration types is hydrocracking. Hydrocracking (as is true, for that matter, of cracking)) of heavy fuel fractions is a very important process of refining, which makes it possible to produce, from excess heavy batches that cannot be readily upgraded, lighter fractions such as light gasolines, light jet fuels, and light gas oils that the refiner seeks in order to adapt his production to the structure of the demand. The batches that are used in hydrocracking are gas-oils, gas-oils under vacuum, deasphalted or hydrotreated residues, or the like.

The catalysts that are used in hydrocracking are all of the dual-function type, combining an acid group with a hydrogenating group. The acid group is supplied by substrates with large surfaces areas (about 150 to 800 m$^2 \cdot$g$^{-1}$) that exhibit superficial acidity, such as halogenated aluminas (chlorinated or fluorinated, in particular), combinations of boron and aluminum oxides, amorphous silica-aluminas and zeolites. The zeolites are currently valued highly. They are used alone or mixed with an amorphous matrix. The hydrogenating group is provided either by one or more metals of group VIII of the periodic table, such as nickel, palladium or platinum, for example, or by a combination of at least two metals that are selected from among groups VI of the periodic table, molybdenum and tungsten in particular, and VIII of the same classification, cobalt and nickel in particular.

The metals of the catalysts that are used in refining, hydrorefining or in petrochemistry, whether they be new or regenerated, are most often in oxidized form. With the metals of these catalysts being often active or high-performing only in sulfurated or at least partially sulfurated form, however, it is therefore necessary for the refiner or the petrochemist to perform sulfuration of the catalyst prior to its use.

The regeneration of catalysts is now being done more and more by someone specializing in catalyst regeneration, sometimes away from the industrial unit. It seems reasonable, however, to consider returning to the refiner a product that is ready for use; this is done in order to make possible the efficient process European patent EP-B-130850 (or U.S. Pat. No. 4,530,917), in which a sulfurated compound is incorporated into the catalytic compound and said compound causes the sulfuration or presulfuration of the catalyst when, later, the catalyst is brought into contact with hydrogen in the reaction zone (zone for treating the batch) or in the immediate vicinity of the reaction zone. Of course, the incorporation of said sulfurated compound can, if desired, be carried out close to the industrial unit or even on the site of catalyst treatment; the process for incorporating said sulfurated compound can be carried out off-site also on a new or regenerated catalyst, before its use in the industrial unit.

More specifically, European Patent No. EP-B-130850 or U.S. Pat. No. 4,530,917 (process called SULFICAT), the process of sulfuration of the catalyst is therefore characterized by a so-called preliminary stage for incorporation of a sulfuirated compound of a special nature into the catalytic compound.

The preliminary stage of introducing a sulfurated compound, which is arbitrarily called "off-site" or "ex-situ" pretreatment, whether it is carried out close to the site of the industrial unit or more or less geographically distant from the industrial unit (where the catalyst has been regenerated or where it was produced, for example), is no longer performed, in any case, in the immediate vicinity of the reactor ("in situ" is written arbitrarily), i.e., at the reactor heads or in zones that are more or less in direct communication with these reactors, thus requiring operations to be carried out under operating conditions (of temperature, pressure or the like) that are imposed at least in part by the operating conditions of the reactors themselves or attachments to these reactors (preliminary hydrogenation zone of the catalyst, for example).

In short, European Patent EP-B-130850 relates to a process (which is thus called SULFICAT) that makes it possible, when the catalyst will be subjected from start-up, preferably on site ("in situ"), to initiate the standard activation reaction in the presence of hydrogen, above 100° C., and then thanks to the presence of hydrogen on the site, to undertake the sulfaration at the required rate, stoichiometric or non-stoichiometric, of the active metal or active metals that are part of the composition of the catalyst. The process consists in incorporating at least one organic polysulfide into the pores of the new or regenerated catalyst in the absence of hydrogen.

The sulfuration of the catalyst can thus be done as follows: in a first stage, which is performed "ex-situ," with no hydrogen, the catalyst is treated by means of the sulfurizing agent to incorporate this agent partially or totally into the pores of the catalyst, with said sulfurizing agent being used i n solution i n a solvent; in a second stage, which is performed "in situ" and preferably at above 150° C., an activation n s stage of the catalyst that is carried out with hydrogen is initiated, with the required amount of sulfur being fixed thanks to the presence of hydrogen on the metal or metals that a re part of the composition of said catalyst.

This last stage has been improved upon in Patent EP-B-181 254 or U.S. Pat. No. 4,719,195. The object of these two patents is to carry out the presulfuration of the catalysts "ex situ" by incorporating all of the sulfur required and only the amount of sulfur required by the user. The catalysts are therefore supplied to the refinery or to any other unit thus preconditioned for sulfuration.

The refiner, or any other user, therefore has only to reactivate this catalyst in the presence of hydrogen at a temperature of, for example, 100 to 400° C. for a hydrotreatment catalyst in order to make the sulfur react on the metals contained and then to start the reaction of refining or of preserving hydrocarbons by injecting the batch to be treated.

Di-tert-dodecylpolysulfide (TPS 32 of ELF) can be cited as a preferred example of polysulfide. Di-tert-nonylpolysulfide (TPS 37 of ELF) can also be cited. For reasons of process, it is obviously possible to use these sulfurizing agents such as polysulfide alone or mixed with one another injudiciously selected proportions.

The first stage mentioned above is carried out with no hydrogen and makes it possible to obtain with great precision the total or partial degree of sulfuration that is required by the user. This incorporation of sulfur is carried out between 0 and 50° C. and preferably between 10 and 35° C., and even more preferably at ambient temperature. The sulfurizing agent is used diluted in a suitable solvent. The solvent that is selected can thus be one of the following solvents, which are used alone or mixed together:

a light gasoline that boils at, for example, between about 60 and 95° C., a hexane type gasoline that boils at between about 63 and 68° C., an F-type gasoline that boils at between about 100 and 160° C., a "white spirit" type gasoline that boils at between about 150 and 250° C., or any fraction that may or may not contain hydrocarbon, equivalent to the above gasolines.

Below, at or near the site (where the catalyst will be used for the treatment of various batches), during the standard activation reaction that is performed with hydrogen (second stage of the process of European Patent EP-B-130 850), the sulfurizing agent that is introduced into the catalyst in a predetermined amount will be able to give rise to the sulfurated hydrogen which, with hydrogen, will lead to sulfur or to the desired sulfurs of the metal or metals that are present in the catalyst according to, for example, the following exothermic diagrammatic reactions (1) (2) (3) with regard to, as examples, the sulfuration of molybdenum, cobalt and nickel:

(1) $MoO_3 \rightarrow MoS_2$ (2) $9\ CoO \rightarrow Co_9S_8$ (3) $3\ NiO \rightarrow Ni_3S_2$ In the applicant's EP-B-181 254 (or U.S. Pat. No. 4,719, 195), it was found that during a first part of said second stage, the presence of hydrogen not only is not necessary, but on the contrary, its absence is even desired. The second part of the second stage can be carried out with hydrogen. The latter is generally carried out in situ and can therefore merge with the start-up or the start itself of the refining reaction or petrochemical reaction for which the catalyst is designed. It has been found that in the first part of the second stage, despite the absence of hydrogen, the catalyst sulfurizes. This phenomenon is ascertained by analysis of the catalyst, which, moreover, becomes black. In contrast, chemisorption tests show that as long as the catalyst does not subsequently reach a certain temperature of 275° C. and does not remain at at least 275° C. for at least several minutes, this catalyst remains devoid of catalytic activity.

The SULFICAT process that is described above was improved after it was discovered that the qualities of the methods described in Patents EP-B-130 850 (U.S. Pat. No. 4,530,917) and EP-B-181254 (U.S. Pat. No. 4,719,195) of the applicant are further improved if the organic polysulfide is used not alone, but mixed in critical amounts with elementary sulfur. The use of elementary sulfur alone for the presulfuration of catalyst is described in patent U.S. Pat. No. 3,177,136 (Herrington), but the results that are obtained are fairly disappointing although correct. In U.S. Pat. No. 3,177,136, a catalyst is presulfurized with molten elementary sulfur at around 100–150° C., preferably 110–130° C. and with no hydrogen. The catalyst that is thus presulfurated is then treated in the presence of hydrogen to transform the elementary sulfur into $H_2S$ at between 200 and 600° C.

Curiously, however, the ultimately inadvisable use of elementary sulfur alone (too quick a start-up, clogging, etc.) provides synergy in off-site presulfuration when this elementary sulfur is used mixed with an organic polysulfide. This improved technique, called (SUPER PLUS), is described in EP-B-448435 or U.S. Pat. No. 5,139,983. Elementary sulfur is used in the form of, for example, molten sulfur, sulfur powder, or sulfur flour, according to any suitable method, for example, the one described in the applicant's patent EP-B-153233.

The preceding processes were the object of another type of improvement which is described in EP-B466 568 (U.S. Pat. No. 5,153,163) called "SSURECAT" and relates to the presulfuration of the catalyst accompanied by passivation. Actually, in the fields of refining and petrochemistry and particularly, as an example, in the reactions of catalytic reforming or of selective hydrogenation of gasolines, it is at times appropriate to reduce the activity of the catalysts that contain metals such as, for example, platinum, palladium, rhenium, iridium, tin, and nickel. Thus, the case of catalysts with nickel, which are excellent catalysts for, for example, hydrogenation of aromatic compounds to such an extent that they can cause runaway during start-ups of new or regenerated catalysts will be cited, even resulting in start-up mishaps and destruction of the reactor. It is therefore necessary to initiate passivation treatment that makes it possible to avoid these runaways. This treatment generally consists in irreversibly poisoning with sulfur the most virulent active nickel sites that are present on the new or regenerated catalyst.

The object of the improvement of SURECAT makes it possible to improve the techniques of prior art and to work under simplified conditions that are less constraining for the refiner. According to "SURECAT," there are simultaneously performed (a) the impregnation of the catalyst with a sulfur compound and (b) the reduction of this catalyst. The reduction of the catalyst is also accomplished with an organic reducing compound, i.e., in the absence of fresh hydrogen. The organic reducing compound is advantageously selected from among the reducing compounds that are described in EP-B-303,525. As a preferred compound, formic acid HCOOH, methyl formate $HCOOCH_3$, and ethyl formate $HCOO\ C_2\ H_5$ will be cited.

In another process, described in EP-B-564 317, the presulfuration of the catalyst is carried out either in the presence of at least one organic polysulfide, or in the presence of elementary sulfur, or by means of at least one organic polysulfide and an elementary sulfur at the same time. Preferably, a mixture of at least one organic polysulfide and an elementary sulfur is used. The solvent used is generally and preferably a white spirit or an equivalent solvent.

In the old methods, during the start-up stage of the catalyst in the refinery unit, exothermic effects that were at times significant were noted, and this method makes it possible to reduce them. The existence of exothermic reactions in the reactor is eliminated or reduced by operating according to this new improvement, which consists in using as a solvent not a white spirit that is used alone, but rather a suitable mixture of a white spirit (or equivalent solvent) and at least one compound or component that contains carbon-bearing bonds such as olefinic bonds and particularly, for example, such as triglyceride bonds. This process makes the sulfur penetrate the pores of the catalyst by dissolution.

To achieve this improvement, the catalyst is brought into contact with elementary sulfur and a liquid that comprises a sulfurizing agent in the group of organic polysulfides, a solvent such as white spirit or a related solvent, and a compound such as an olefin, and then the mixture is subjected to heat treatment that is aimed at, on the one hand, eliminating the solvent, and, on the other hand, causing particularly a combination reaction between the elementary sulfur and the double bonds of the olefinic compound. The heat treatment is carried out at a temperature of greater than 100° C. and preferably greater than 120° C. The elementary sulfur is thus combined partially or completely in the form of a polysulfide.

It should be noted that other patents, and particularly U.S. Pat. No. 5,215,954, also relate to the presulfuration of catalysts by a method that makes it possible to incorporate elementary sulfur into the pores of the catalyst; but here the elementary sulfur penetrates the pores basically by melting or by sublimation.

Later, an effort was also made to improve the techniques for presulfurizing a catalyst in the case where catalysts are used that are suited for special constraints. A process for presulfurizing a catalyst, called bi-phase, is described in EP-B 628347 and is characterized by the use of a presulfurizing agent that contains (a) at least a first sulfurated compound with a decomposition point T1 that is less than 220° C. and (b) at least a second sulfurated compound with decomposition point T2 greater than about 220° C. All of the preceding methods are the object of an additional improvement, which improvement lends itself to the presulfuration of a large portion of the catalysts that are mentioned in the preceding pages. This improvement, called TOTSUCAT and described in French Patent Application 94/12096, consists of a process that comprises the incorporation of a sulfurizing agent that is selected from the group that consists, for example, particularly of elementary sulfur and organic polysulfides into a hydrocarbon treatment catalyst and in more or less large part into the pores of this catalyst, with this incorporation being carried out in the presence of a solvent which contains completely or in part a component such as olefin or an olefinic fraction, for example, such as vegetable oil, or a similar component, with the process comprising treatment of the catalyst with hydrogen at between 150 and 700° C., and then a stage of oxidizing passivation.

This invention is an improvement on all of the methods of "in-situ" or "ex-situ" sulfuration or presulfuration of catalysts that are used particularly in refining/petrochemistry. It relates to a method for incorporating sulfur into the pores of the catalyst. The sulfur that is introduced into the catalyst is bonded to active metals of the catalyst (molybdenum, tungsten, nickel, cobalt or other metals), which means that if lixiviation of the catalyst is done (extraction by solvent, even at a high temperature), the majority of the sulfur remains in the catalyst. The sulfur can be introduced in the form of sulfurated hydrogen in a process according to the invention in a single stage, but it can also be introduced in the form of elementary sulfur or any other sulfur compound. In the implementation of the invention, the presence of pure or dilute hydrogen is necessary to help the sulfurated hydrogen penetrate the mass of the catalyst or, when not fresh sulfurated hydrogen, but elementary sulfur or a sulfurated compound is used to transform at least a large portion of the elementary sulfur or the sulfurated compound into sulfurated hydrogen. The sulfurated compounds that can be used are all sulfurated compounds that can decompose under hydrogen into sulfurated hydrogen, such as, for example, elementary sulfur, mercaptans, sulfides, disulfides, or oxygen compounds of the sulfur, as well as organic polysulfides. The process is also characterized by the fact that it is carried out preferably in a fluid bed or equivalent bed and that, in contrast, the sulfuration occurs at a location that is different from its final site of use, i.e., outside of the hydrocarbon hydroconversion reactor (off-site or ex-situ).

The invention may be implemented for instance between 80 and 450° C., preferably between 110 and 400° C. and in at least one stage and, for example, in a single stage. The invention is implemented in one stage particularly when the sulfurated compound is sulfurated hydrogen. In this case, contact between the catalytic compound, sulfurated hydrogen and hydrogen, with the possible presence of water vapor, is achieved primarily if the operation is carried out at a relatively low temperature. The process can be executed in the presence of water. The presence of water vapor can enhance the quality of the sulfuration primarily when the operation is carried out at a low temperature of between 80 and 250° C., and preferably between 100 and 200° C.

The invention can also be implemented in one stage if, instead of sulfurated hydrogen, a sulfurated compound which is going to decompose immediately into sulfurated hydrogen is introduced in a mixture or simultaneously with hydrogen. This sulfurated compound is selected from the group of mercaptans, sulfides, disulfides, polysulfides, and oxidized compounds of sulfur. For example, butyl mercaptan; dimethyl sulfide; dimethyl disulfide; butyl, octyl or nonyl polysulfides; dimethyl sulfoxide; sulfolane, etc. will be cited.

The invention can also be implemented in two stages. During the first stage, the catalytic compound is thoroughly mixed with the elementary sulfur or the sulfur compound (other than the sulfurated hydrogen) and in the absence of hydrogen. It is possible to operate with the possible presence of a solvent, such as those described above in connection with descriptions of the techniques of the prior art, particularly white spirit.

It is optionally possible at this stage to add an olefinic oil or a vegetable oil to the white spirit. This contact is made, for example, at between 10 and 320° C. preferably between 80 and 250° C., and the incorporation of sulfur or sulfurated compound (other than sulfurated hydrogen) is done into the pores of the catalyst.

It is possible to operate in the presence of water vapor and/or in the presence of an inert gas. It is preferable to operate in the presence of an inert gas.

The second stage can optionally also be carried out in the zone where the first stage is carried out. Generally, however, the second stage is carried out in a zone that is separate from that in which the first stage is carried out.

During the second stage that is carried out in the temperature ranges already indicated, for example, between 80 and 450° C. and more particularly between 110 and 400° C., the catalytic compound into which the sulfur is therefore incorporated is brought into contact with hydrogen in the optional presence of water vapor. In this stage occurs the formation of sulfurated hydrogen, then the reaction between the metal oxides of the catalyst and the nascent sulfurated hydrogen, i.e., formed in-situ, during which reaction the sulfur is bonded to the catalyst.

When the two-stage process is used, the first stage makes it possible to incorporate an amount of sulfur that is at least equal to half the sulfur that corresponds to the stoichiometric amount of the sulfides of the metals that are deposited on the surface of the catalyst, which are written in the following way:

To summarize, whether the operation is carried out in 1 or 2 stages, the reaction between hydrogen sulfide and the oxides is written in the following way:

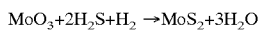

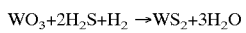

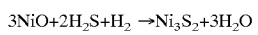

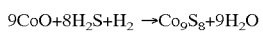

The method according to the invention is characterized by the fact that the hydrogen/sulfurated hydrogen mixture, which optionally contains an inert gas, reacts directly with the oxides of the metals of the catalyst and that this mixture is either introduced directly into the reaction system or preferably is formed in situ by reaction between hydrogen and any suitable compound that contains sulfur.

The formation of sulfurated hydrogen by reaction between hydrogen and this sulfurated compound is written differently depending on the type of compound, as illustrated below as examples:

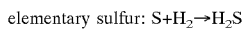

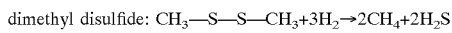

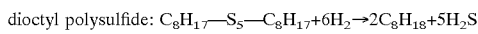

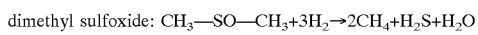

At the end of the one-stage or two-stage reaction, the catalyst is purged under inert gas to evacuate the hydrogen at least in part and especially generally of the sulfurated hydrogen at least in part in its pores. Generally, it is suitable to evacuate essentially all of the residual hydrogen and sulfurated hydrogen.

One of the aspects of the invention is that the sulfuration of the catalyst is carried out "off-site," i.e., at a location that is separate from the location where the catalyst is used for its function of conversion or of hydroconversion of petroleum batches. This particular feature provides many advantages, particularly because the catalyst that is charged into the unit already contains the necessary amount of sulfur, but also that it is already activated, furthermore and is thus already ready to be used as an active catalyst. This particular feature saves time that is valuable to the user of the refinery catalytic unit because it considerably simplifies the start-up procedure.

Another aspect of the invention is that, unlike the techniques of the prior art, this sulfuration preferably occurs on a catalyst which is in motion in the sulfur incorporation zone. The activation reactions thus occur while the catalyst is in motion.

It is possible to use, for example, a sinking type of bed, where the solid slowly descends by gravity along a tube or a ring, a fluidized bed where the solid is lifted by a gas stream with a high flow rate, a fluidized bed or a bed where the catalyst circulates either in a belt furnace or in a rotary kiln. The bed can optionally be expanded or bubbling.

Without judging in advance more developed scientific theories, this mobility of the catalyst during the formation phase of the sulfur types ensures homogeneous treatment and thus high quality.

The potential problem, actually, of the fixed beds is the existence of preferred paths, which has the effect of creating zones where the catalyst will have been exposed to inadequate amounts of sulfur relative to the necessary stoichiometry. Another potential problem of the fixed beds is also the relative difficulty of removing the calories that are formed by the exothermal sulfuration reactions. The continuous stirring of the catalyst is advantageous in these two examples. Thus, preferably, the operation is carried out with a catalytic bed that is in motion, in that the process is carried out in a single stage or in two stages. When the process is carried out in two stages and then preferably in two separate zones, it is preferable to operate with a catalyst that is in motion either in the first stage or in the second stage, or preferably in motion in each of the two beds of these two stages.

A typical embodiment of the process according to the invention comprises transporting the catalyst particles into a heated furnace, preferably a heated rotary furnace, where the temperature of the particles is raised to above 120° C., for example between 120° and 200° C. Next, the particles are contacted, for example by spraying, with molfen elemental sulphur having a temperature in the range of 120° to 160° C. In the second step, which is carried out in the same or a different (rotary) furnace, the molten sulphur impregnated particles are contacted with hydrogen or a hydrogen-containing gas at a temperature of about 80° to 450 °C., preferably 110° to 400° C., and more preferably 250° to 400° C. It will be obvious to the skilled person that between the first and the second step, the temperature of the catalyst particles preferably is not lowered. Subsequent to the hydrogenation step, the particles are transported out of the furnace and cooled.

The examples below illustrate the invention.

EXAMPLE 1

Catalyst that is presulfurated with an $H_2S/H_2O/H_2$ mixture. The operation is carried out in a single stage. A commercial catalyst such as CoMo on alumina (HR 306 of the PROCATALYSE Company) is treated with an $H_2S/H_2O/H_2$ mixture that contains 15% $H_2S$, 15% $H_2O$ and 70% $H_2$ by volume. Water is injected into the gas circuit with a liquid pump. The reactor is a continuous rotary system for which the dwell time at the indicated temperature is about 80 minutes. In this example, the temperature is 110° C. Cooling is carried out under hydrogen, then under nitrogen. Catalyst A is thus obtained. The sulfur content is analyzed on catalyst A just as is, as well as on the solid that was previously washed in hot toluene in a Soxhlet apparatus. The degree of sulfuration is estimated from the level of quadrivalent molybdenum compared to hexavalent molybdenum by the X photoelectron spectroscopy technique. Molybdenum $4^+$ corresponds to sulfur types that are related to $MoS_2$, whereas molybdenum $6^+$ corresponds to oxide types that preexist on fresh catalyst. The results are presented in Table 1.

EXAMPLE 2

Catalyst B is obtained in a manner that is identical to that of Example 1, if the temperature is 300° C. instead of 110° C.

EXAMPLE 3

Catalyst C is obtained as above in Example 1 at 110° C., but the gas mixture does not contain $H_2O$, which is replaced by an inert gas stream. The gas composition is the following 15% $H_2S$, 15% $N_2$, 70% $H_2$.

In conclusion, from these three first tests that were carried out in the presence of pure sulfurated hydrogen, it appears that the temperature of 110° C. is sufficient to initiate significant sulfuration of the catalyst and that it is preferable that the gas contain a certain partial pressure of water vapor. If this is not the case, the levels of sulfuration that are indicated by the stoichiometric levels or the $Mo^{4+}/Mo^{6+}$ ratios may appear inadequate. Even so, the temperature of 300° C. makes it possible to reach much higher sulfuration levels (as Example 8 shows).

EXAMPLE 4

Catalyst that is presulfurated with elementary sulfur, then activated under hydrogen at 300° C. (Two-stage process).

A commercial catalyst such as CoMo/alumina is mixed mechanically at regular temperature with elementary sulfur that has an average grain size of less than 5 microns. 100 g of catalyst is mixed with 21.6 g of sulfur that is put into suspension in 45 ml of white spirit (with initial and final boiling points of 140 and 180° C.). This amount of sulfur corresponds to a stoichiometry of 200% relative to $MoS_2/Co_9S_8$. The catalyst (second stage) is then admitted into the same rotary system as in the preceding examples, under an atmosphere of pure hydrogen. The dwell time at the temperature of 300° C. is 80 minutes. The analysis of the corresponding catalyst is presented in Table 1 (catalyst D). The sulfuration level of the catalyst is correct, and the sulfur is not very extractable in toluene, which shows that the sulfur that is present is basically a bonded sulfur and not simply deposited. The lixiviation operation is done here as a test to see if the sulfur is actually attached (bonded) to the catalyst. Here, extraction is performed with toluene.

EXAMPLE 5

Example 5 is carried out like the preceding example except that the gas stream consists of a hydrogen/water mixture with 80% volume of hydrogen. The 20% of the water volume is recreated by a liquid water injection pump. This is thus catalyst E. Analyses show that it is not very different from catalyst D.

EXAMPLE 6

(Comparative, since there is no hydrogen in the second stage)

Example 6 is carried out like No. 4 by replacing the hydrogen/nitrogen stream with a nitrogen/water stream of 80/20% volume according to Table 1. The sulfuration level on crude catalyst is reduced and especially on lixiviated catalyst, showing that sulfur is not bonded to the catalyst.

EXAMPLE 7

Catalyst that is presulfurated with an organic polysulfide (first stage), then activated under hydrogen (second stage).

The same catalyst CoMo on alumina as in the preceding examples is impregnated with a solution of a di-tert-nonyl polysulfide mixture that is dissolved in a white spirit. 31 g of di-tert-nonyl polysulfide (TPS 37 of ATOCHEM with a sulfur content of 37% by weight) mixed with 18 ml of white spirit that is used in the preceding examples is added to 100 g of catalyst. The catalyst is stirred for 10 minutes at regular temperature to obtain a homogenous suspension. It is then subjected to heat treatment under nitrogen at 120° C. to eliminate the bulk of the organic solvent. Then, the catalyst is fed onto a rotary kiln under a stream of hydrogen (second stage). The dwell time at the temperature of 300° C. is about 80 minutes. The sulfuration levels of the solid obtained (catalyst G) before and after washing with toluene are high, showing that the sulfur is well fixed, and the reduced molybdenum is at stage $4^+$. In conclusion, from these Examples 4, 5, 6, 7 it seems that the process can be implemented in a 2-stage version, with a stage for incorporating sulfurated compound in a catalyst followed by an activation stage.

EXAMPLE 8

This example is as specified by the invention and identical to Example 2, except that the operation is carried out in the absence of water vapor; the treatment atmosphere is a mixture of $H_2/H_2S$ at 15% $H_2S$ and 85% $H_2$, also in a rotary kiln at 300° C. The amount of hydrogen sulfide that is used corresponds to 1.5 times the amount that is theoretically necessary to produce $MoS_2/Co_9S_8$. After cooling under hydrogen and purging under nitrogen, catalyst H is obtained (which proves to be better presulfurated than in comparable Example No. 3, where the temperature used was only 110° C.).

EXAMPLE 9

In this case, pure hydrogen is used. The gaseous hydrogen sulfide is replaced with an injection of dimethyl disulfide in the hydrogen circuit. The amount of sulfur injected in the form of DMDS corresponds to 1.5 times the $MoS_2/Co_9S_8$ stoichiometric amount. The dwell time at 300° C. is 80 minutes, as in the preceding example. After cooling under hydrogen and purging under nitrogen, catalyst 1 is obtained.

EXAMPLE 10

The H type catalysts, as well as the reference CoMo fresh catalyst (HR306 of Procatalyse), are charged by turns into a catalytic test unit. The three catalysts will be tested in hydrodesulfuration of atmnospheric gas oil under the following conditions: pressure: 60 b; temperature: 340° C.; hourly volume velocity: $2\ h^{-1}$; with a batch of the following properties: sulfur content: 1.23 % pds; initial point 225, final point: 392° C.

The start-up procedure differs for the three catalysts, with the first two already being presulfurated and activated and the third also being oxide. The last will actually be subjected to the following procedure to transform it into catalyst The rise in temperature is carried out under hydrogen at 5° C./minute up to 220° C., where a plateau of one hour is observed.

The dimethyl disulfide injection circuit is actuated to add, at the beginning of the plateau, an amount of 1.6 g of S per hour via a DMDS solution that is diluted to 10% in naphtha. After 1 hour at the plateau, the injection rate is reduced to 1.2 g of S per hour, and the rate of temperature rise is restarted at 1° C./minute to up to 300° C. where a plateau of 80 minutes is observed. The injection of DMDS is then halted. This is then the end of the activation procedure for catalyst J, with the amount of DMDS corresponding to 1.5 times the stoichiometric amount of sulfur.

The temperature is then lowered to 200° C., the atmospheric gas oil is injected, and the temperature rises at 2° C./minute up to 340° C. The performance of hydrodesulfuration is measured after 12 hours of stabilization.

With regard to the cases of catalysts H and I, the procedure does not comprise sulfuration, simply a rise in temperature at 5° C./minute up to 200° C., the injection of gas oil at 200° C. and the rise at 2° C./minute up to 340° C., where the HDS level is measured after 12 hours. The results are presented in the last line of Table 1, showing a very clear advantage for the two products that are presulfurated outside of the test unit and in a fluidized bed, compared to the presulfurated catalyst in a fixed bed.

TABLE 1

| Example | 1 | 2 | 3 | 4 | 5 | 6 | 7 | 8 | 9 | 10 |
|---|---|---|---|---|---|---|---|---|---|---|
| Catalyst | A | B | C | D | E | F | G | H | I | J |
| Initial sulfurizing agent* | $H_2S$ | $H_2S$ | $H_2S$ | ES | ES | ES | PS | $H_2S$ | DMDS | DMDS |
| Number of stages | 1 | 1 | 1 | 2 | 2 | 2 | 2 | 1 | 1 | 1 |
| Fluidized bed (m), fixed bed (f) | m | m | m | m | m | m | m | m | m | f |
| $H_2O$ | + | + | − | − | + | − | − | − | − | − |
| $H_2$ | + | + | + | + | + | − | + | + | + | + |
| Temperature (° C.) | 110 | 300 | 110 | 300 | 300 | 300 | 300 | 300 | 300 | 300 |
| Stoichiometry on crude (%) | 76 | 97 | 68 | 84 | 88 | 65 | 88 | 99 | 92 | / |
| Stoichiometry on lixiviated (%) | 62 | 92 | 55 | 82 | 81 | 27 | 84 | 92 | 90 | / |

TABLE 1-continued

| Example | 1 | 2 | 3 | 4 | 5 | 6 | 7 | 8 | 9 | 10 |
|---|---|---|---|---|---|---|---|---|---|---|
| Catalyst | A | B | C | D | E | F | G | H | I | J |
| $\dfrac{Mo^{4+}}{Mo^{4+}+Mo^{6+}} \times 100$ | 70 | >80 | 60 | >80 | >80 | <20 | >80 | >80 | >80 | / |
| Desulfuration level (%) | | | | | | | | 94.1 | 93.4 | 92.0 |

*$H_2S$: hydrogen sulfide
*ES: elementary sulfur
*PS: polysulfide such as TNPS
*DMDS: dimethyl disulfide
The + and − indicate the presence or absence of gaseous compound.

What is claimed is:

1. A process for incorporating sulfur into the pores of a hydrocarbon conversion catalyst that contains at least one metal oxide of groups VI or VIII of the periodic table, consisting essentially of contacting said catalyst with hydrogen and $H_2S$, or with hydrogen and sulfurated compound that can be converted to $H_2S$ in the presence of hydrogen, wherein said contacting is performed off-site in a catalytic bed which is in motion, in one stage, so as to simultaneously presulfurate and activate said catalyst under conditions resulting in the formation of a sulfide of at least part of said metal oxide, and wherein said contacting is carried out between 80 and 450° C.

2. A process according to claimed 1, wherein the contacting is conducted at 110–400° C.

3. The process according to claim 1, wherein the contacting is carried out in gas phase in the presence of water vapor.

4. The process according to claim 1, wherein the contacting is carried out in the absence of water vapor at a temperature of greater than 250° C.

5. The process according to claim 1, in which said catalytic bed is selected from the group that consists of fluid beds, circulating beds, fluidized beds, expanded beds, ebullated beds, belt beds and rotary beds.

6. The process according to claim 1, in which said sulfurated compound is selected from the group that consists of elemental sulfur, mercaptans, sulfides, disulfides, polysulfides and oxidized sulfur compounds.

7. The process according to claim 6, in which said sulfurated compound is selected from the group consisting of butyl mercaptan, dimethyl sulfide, dimethyl disulfide, butyl, octyl and nonylpolysulfides, dimethyl sulfoxide and sulfolane.

8. The process according to claim 1, wherein at the end of the process, the catalyst is purged, under inert gas, to evacuate at least part of the residual $H_2S$.

9. The process according to claim 8, wherein essentially all of the hydrogen and $H_2S$ are evacuated.

10. A process according to claim 1, wherein at least one of the following reactions occurs:

$$MoO_3 + 2H_2S + H_2 \rightarrow MoS_2 + 3H_2O$$

$$WO_3 + 2H_2S + H_2 \rightarrow WS_2 + 3H_2O$$

$$3NiO + 2H_2S + H_2 \rightarrow Ni_3S_2 + 3H_2O$$

$$9CoO + 8H_2S + H_2 \rightarrow Co_9S_8 + 9H_2O.$$

11. A process according to claim 10, wherein the catalyst contains $MoO_3$ and wherein over 80% of $MoO_3$ is converted to MoS2.

* * * * *